(12) United States Patent
Orbach et al.

(10) Patent No.: US 7,616,890 B2
(45) Date of Patent: Nov. 10, 2009

(54) SYSTEM, DEVICE AND METHOD OF EXPANDING THE OPERATIONAL BANDWIDTH OF A COMMUNICATION INFRASTRUCTURE

(75) Inventors: Zeev Orbach, Ashkelon (IL); Hillel Weinstein, Haifa (IL)

(73) Assignee: Xtend Networks Ltd., Airport (IL)

( * ) Notice: Subject to any disclaimer, the term of this patent is extended or adjusted under 35 U.S.C. 154(b) by 344 days.

(21) Appl. No.: 11/311,311

(22) Filed: Dec. 20, 2005

(65) Prior Publication Data

US 2006/0101501 A1 May 11, 2006

Related U.S. Application Data

(63) Continuation-in-part of application No. 09/830,015, filed as application No. PCT/IL01/00181 on Feb. 27, 2001, now abandoned.

(60) Provisional application No. 60/636,856, filed on Dec. 20, 2004.

(30) Foreign Application Priority Data

Oct. 16, 2000 (WO) .................. PCT/IL00/00655

(51) Int. Cl.
*H04J 14/00* (2006.01)
*H04B 10/00* (2006.01)
(52) U.S. Cl. ............................. 398/67; 398/72; 398/115
(58) Field of Classification Search ............ 398/66–68, 398/70–72, 74, 115, 116
See application file for complete search history.

(56) References Cited

U.S. PATENT DOCUMENTS 3,491,199 A 1/1970 Weinstein et al.
4,245,245 A 1/1981 Matsumoto et al.
4,506,387 A 3/1985 Walter
4,553,161 A 11/1985 Citta
4,641,363 A 2/1987 Hasegawa (Continued)

FOREIGN PATENT DOCUMENTS

EP 0 577 351 1/1994

(Continued)

OTHER PUBLICATIONS

International Search Report of Application No. PCT/IL05/01361 issued on Sep. 13, 2007.

(Continued)

*Primary Examiner*—Dalzid Singh
(74) *Attorney, Agent, or Firm*—Pearl Cohen Zedek Latzer, LLP (57) ABSTRACT

Embodiments of the invention include a method, device an/or system of expanding the operational bandwidth of a communication infrastructure. An optical gathering box may include, according to some demonstrative embodiments of the invention, an optical connector to optically connect the apparatus to an optic fiber; and at least one interface including first and second radio-frequency connectors; an optical to radio-frequency converter to convert a downstream optical signal received via the optical connection into an extended downstream radio-frequency signal in an extended downstream frequency band; and a triplexer to route the extended downstream signal to the first radio-frequency connector; to route a legacy downstream radio-frequency signal in a legacy frequency band from the second radio-frequency connector to the first radio-frequency connector; and to route a legacy upstream radio-frequency signal in the legacy frequency band from the first radio-frequency connector to the second radio-frequency connector. Other embodiments are described and claimed.

21 Claims, 8 Drawing Sheets

U.S. PATENT DOCUMENTS

| | | | |
|---|---|---|---|
| 4,970,722 | A | 11/1990 | Preschutti |
| 5,058,198 | A | 10/1991 | Rocci et al. |
| 5,109,286 | A | 4/1992 | West et al. |
| 5,130,664 | A | 7/1992 | Pavlic et al. |
| 5,194,947 | A | 3/1993 | Lowcock et al. |
| 5,218,714 | A | 6/1993 | Ishibashi et al. |
| 5,301,245 | A | 4/1994 | Endoh |
| 5,481,757 | A | 1/1996 | Mihara et al. |
| 5,499,047 | A | 3/1996 | Terry et al. |
| 5,532,733 | A | 7/1996 | Wignot |
| 5,587,734 | A | 12/1996 | Lauder et al. |
| 5,600,573 | A | 2/1997 | Hendricks et al. |
| 5,694,232 | A * | 12/1997 | Parsay et al. ............ 398/42 |
| 5,701,152 | A | 12/1997 | Chen |
| 5,708,961 | A | 1/1998 | Hylton et al. |
| 5,724,646 | A | 3/1998 | Ganek |
| 5,768,682 | A | 6/1998 | Peyrovian |
| 5,774,458 | A | 6/1998 | Williamson |
| 5,790,202 | A | 8/1998 | Kummer et al. |
| 5,790,806 | A | 8/1998 | Koperda |
| 5,805,804 | A | 9/1998 | Laursen et al. |
| 5,815,146 | A | 9/1998 | Youden et al. |
| 5,819,036 | A | 10/1998 | Adams et al. |
| 5,822,677 | A | 10/1998 | Peyrovian |
| 5,826,167 | A | 10/1998 | Jelinek et al. |
| 5,864,672 | A * | 1/1999 | Bodeep et al. ............ 725/126 |
| 5,881,362 | A | 3/1999 | Eldering et al. |
| 5,961,603 | A | 10/1999 | Kunkel et al. |
| 5,963,844 | A | 10/1999 | Dail |
| 5,999,970 | A | 12/1999 | Krisbergh et al. |
| 6,014,547 | A | 1/2000 | Caporizzo et al. |
| 6,049,539 | A | 4/2000 | Lee et al. |
| 6,134,419 | A | 10/2000 | Williams |
| 6,199,207 | B1 | 3/2001 | Jelinek et al. |
| 6,253,375 | B1 | 6/2001 | Gordon et al. |
| 6,348,837 | B1 | 2/2002 | Ibelings |
| 6,362,908 | B1 | 3/2002 | Kimbrough et al. |
| 6,381,745 | B1 | 4/2002 | Paul |
| 6,393,607 | B1 | 5/2002 | Hughes et al. |
| 6,462,923 | B1 | 10/2002 | Vokey |
| 6,481,013 | B1 | 11/2002 | Dinwiddie et al. |
| 6,487,391 | B1 | 11/2002 | Park |
| 6,536,042 | B1 | 3/2003 | Paul |
| 6,538,781 | B1 * | 3/2003 | Beierle et al. ............ 398/79 |
| 6,577,414 | B1 | 6/2003 | Feldman et al. |
| 6,615,407 | B1 | 9/2003 | Inaguma |
| 6,667,723 | B2 | 12/2003 | Forrester |
| 6,785,907 | B1 | 8/2004 | Dan et al. |
| 6,895,185 | B1 | 5/2005 | Chung et al. |
| 6,941,576 | B2 | 9/2005 | Amit |
| 2002/0174435 | A1 | 11/2002 | Weinstein et al. |
| 2003/0066088 | A1 | 4/2003 | Jung |
| 2004/0172658 | A1 | 9/2004 | Rakib et al. |
| 2005/0114903 | A1 | 5/2005 | Ahmed et al. |
| 2005/0155082 | A1 | 7/2005 | Weinstein et al. |
| 2005/0283816 | A1 | 12/2005 | Weinstein et al. |

FOREIGN PATENT DOCUMENTS

| | | |
|---|---|---|
| EP | 0 589 531 | 3/1994 |
| EP | 0 695 092 | 1/1996 |
| EP | 0 742 658 | 11/1996 |
| EP | 963 116 | 12/1999 |
| EP | 1608168 | 12/2005 |
| IL | 160035 | 1/2004 |
| JP | 4-196792 | 7/1992 |
| JP | 9-162818 | 6/1997 |
| JP | 11-041213 | 2/1999 |
| WO | WO 96/08925 | 3/1996 |
| WO | WO 99/14953 | 3/1999 |
| WO | WO 99/16201 | 4/1999 |
| WO | WO 01/22364 | 3/2001 |
| WO | WO 01/41890 | 6/2001 |
| WO | WO 01/60066 | 8/2001 |
| WO | WO 02/33969 | 4/2002 |
| WO | WO 03/049225 | 6/2003 |

OTHER PUBLICATIONS

International Search Report of Application No. PCT/IL01/00181 issued on Oct. 11, 2001.

International Search Report of Application No. PCT/IL00/00655 issued on Feb. 6, 2001.

Jari Peltoniemi; Video-on-Demand Overview, Internet; Jan. 30, 1995; <URL:http://www.cs.tut.fi/tlt/stuff/vod/VoDOverview/vod1/html>.

SeaChange-News Internet, Jul. 11, 2001; CISCO Systems; Multimedia Traffic Engineering for HFC NB URL:http://www.seachangeinternational.com/2000/pr255.html, SeaChange-Broadband Case Study Internet, URL:http://seachangeinternational.com/case_study_broadband.html Seachange.

CISCO Systems; Multimedia Traffic Engineering for HFC Networks, a White Paper on Data, Voice, and Video over IP, Jan. 1, 1999.

Unknown, Aug. 25, 2002; Internet pages from http://www.dxcomm.com/products/Motorola.

Epcos, Jun. 08, 2002, RF Transformer Splitter and Matching Transformer.

Ciciora et al., Jan. 1, 1999, Chapters 9, 10, 13 and 14 of the book "modern Cable Television Technology, Video, Voice and Data Communications", "Coaxial RF Technology", "Coaxial Distribution System Design", "Return Path Interference Mitigation Techniques".

Christiansen, Jan. 1, 1997, "Electronics Engineers' Handbook" by McGraw Hill 26.57-26.66 and 25.65.

Unknown, Aug. 13, 2000, Pages from URL: http://www.eccentrix.com, http://www.divx-digest.com, http://www.ultimateresourcesite.com, <http://www.cnet.com>.

Rath et al., Jun. 1, 1997, "Interactive Digital Video Networks: Lessons from a Commercial Deployment", IEEE Communication Magazine, IEEE Service Center, Piscataway, N.J., US, vol. 35, No. 6, pp. 70-74, XP000659191, ISSN: 0163-6804.

Economist, Sep. 17, 2001, Reality Check for Video-on-Demand, Internet <URL:http://www.economist.com/science/tq/displaystory.cfm?Story_ID=662210>.

Unknown, Jul. 11, 2001, DIVA Web Site: <URL:http://www.divata.com/HTML_mirror/products/prod_overview.html> URL:http://www.divatv.com/php/prod_link.php3, URL:http://www.divatv.com/HTML_mirror/services/serv_navigator.html, URL:http://www.divatv.com/php/prod_server.html.

Chism, Sep. 17, 2001, Personal Video Recorder (PVR) Meets Video-on-Demand (VOD) First presented at the Society of Cable Telecommunication Engineers (SCTE) 2001 Conference on Emerging Technologies by Bob Chism, Vice President, Development, Concurrent Computer Corporation.

Electroline Electronics Equipment Inc. "Increasing Subscribers & Improving Profitability with Addressable Taps", @ Nov. 1999.

European Search Report of Application No. EP 02 72 7999 mailed Jun. 1, 2005.

* cited by examiner

SYSTEM, DEVICE AND METHOD OF EXPANDING THE OPERATIONAL BANDWIDTH OF A COMMUNICATION INFRASTRUCTURE

CROSS-REFERENCE TO RELATED APPLICATIONS

This application claims priority of U.S. Provisional Patent Application, 60/636,856, filed Dec. 20, 2004; and is a Continuation-In-Part of U.S. patent application Ser. No. 09/830,015, entitled "System, Apparatus and Method for Expanding the Operational Bandwidth of a Communication System", filed Jul. 20, 2001 now abandoned, as a National Phase Application of International Patent Application PCT/IL0100181, filed on Feb. 27, 2001, and published Apr. 25, 2002 as International Publication number WO02/33969, which in turn claims priority from International Patent Application PCT/IL0000655, filed Oct. 16, 2000, and published Apr. 25, 2002 as International Publication number WO02/33968, the disclosures of all of which are incorporated herein by reference in their entirety.

FIELD OF THE INVENTION

The present invention generally relates to communication systems and methods and, more particularly, to devices, systems and methods of expanding the effective frequency range of broadband communication, for example, over a cable television network.

BACKGROUND OF THE INVENTION

Cable television (CATV) is a form of broadcasting that transmits programs to paying subscribers via a physical land based infrastructure of coaxial ("coax") cables or via a combination of fiber-optic and coaxial cables (HFC).

CATV networks provide a direct link from a transmission center, such as a head-end, to a plurality of subscribers at various remote locations, such as homes and businesses, which are usually stationary and uniquely addressable. The head-end may be connected to the subscribers via local hubs, commonly referred to as "nodes", which route the flow of data to and/or from a predefined group of subscribers, e.g., hundreds of subscribers, in a defined geographical area, for example, a small neighborhood or an apartment complex. The typical distances between the local nodes and the subscribers are relatively short, for example, up to a few thousand feet. Therefore, the communication between nodes and their subscribers is commonly referred to as "last mile" communication.

Existing CATV networks utilize a signal distribution service to communicate over multiple channels using various formats, for example, analog and/or digital formats for multi-channel TV programs, a high definition TV (HDTV) format, providing interactive services such as "video on demand", and other multimedia services, such as Internet access, telephony and more.

A number of elements are involved in maintaining a desired flow of data through coaxial conductors or through a combination of fiber optics and coaxial cables from the head-end to the subscribers of a CATV system. In a conventional HFC cable TV system, the head end is connected to the local nodes via dedicated optical fibers. In the last mile system, each local node converts the optical signals received from the head-end into corresponding electrical signals, which may be modulated over a radio frequency (RF) carrier, to be routed to the local subscribers via coax cables.

The head-end is the central transmission center of the CATV system, providing content (e.g., programs) as well as controlling and distributing other information, e.g., billing information, related to customer subscribers.

The downstream signals, which are limited to designated channels within a standard frequency range (band) of 48 MHz to 860 MHz (or up to 1,000 MHz by recently introduced Stretching technology) are modulated on a light beam, e.g., at a standard wavelength of 1550 nm, and sent to the local node via a fiber-optical cable. An optical converter at the local node detects the optical signals and converts them into corresponding electrical signals to be routed to the subscribers.

In the reverse direction, the local optical node receives upstream data from all the local subscribers in the last mile section. These are carried by RF electrical signals at a standard frequency band of 5 MHz to 42 MHz, which does not overlap with the downstream band. A converter in the local optical node converts the upstream data into corresponding optical signals by modulating the data on an optical carrier beam, e.g., at a wavelength of 1310 nm, to be transmitted back to the head-end.

The electrical last mile system usually includes low-loss coax cables, which feed a plurality of serially-connected active elements, for example, line extension amplifiers and, if necessary, bridge trunk amplifiers (e.g., in case of splitting paths). In addition, many passive devices of various types may be fed by tapping from the main coaxial line in between the active amplifiers. These passive devices may be designed to equalize the energies fed to different subscriber allocations such that signals allocated to subscribers closer to the local node and/or to one or more of the active devices may be attenuated more than signals allocated to subscribers further away from the node or active devices.

In conventional systems, each passive device can feed a small group of subscribers, usually up to 8 subscribers, via drop cables having a predetermined resistance (e.g., 75Ω), feeding designated CATV outlets at the subscriber end. The drop cables are flexible and differ in attenuation parameters from the coaxial cables that feed the passive devices. The hierarchy of commonly used coaxial drop cables includes the RG-11 coaxial cable, which has the lowest loss and thus the highest performance, then the intermediate quality RG6-cable, and finally the basic quality RG-59 cable. All drop cables used in the industry are usually connected using standard "F type" connectors.

SUMMARY OF SOME DEMONSTRATIVE EMBODIMENTS OF THE INVENTION

Some demonstrative embodiments of the present invention may include an improved "last mile" segment of a communication system, such as a Cable Television (CATV) system, in addition or instead of existing last mile segments.

Devices, systems and/or methods according to some demonstrative embodiments of the invention may expand the operational bandwidth of a CATV system, for the downstream and/or upstream paths, e.g., by 2 GHz or more (an improvement of more than 200% compared to the limited ranges of conventional downstream and upstream signals). This may enable communication over multiple channels at exceptionally high data transmission rates, e.g., up to Gigabits per second.

Additionally, some embodiments of the invention may provide Symmetrical data transfer, e.g., expansion of "upstream" throughput such that the "upstream" throughput may be as high as the "downstream" throughput. Furthermore, some embodiments of the invention may provide this expanded bandwidth without compromising quality, and particularly without adversely interrupting and/or interacting with standard legacy services, which may continue to operate in parallel with the system of the invention in some embodiments, e.g., using the coaxial cables, active devices and passive devices of existing last mile CATV infrastructures.

Some demonstrative embodiments of the invention introduce a supplemental and/or alternative method of last mile communication between nodes and subscribers, for example, using a local fiber optical system that may carry expanded broadband signals, e.g., in parallel with an existing local coaxial system, wherein the local coaxial system may continue to transmit legacy signals in an uninterrupted manner.

According to some embodiments of the invention, at least some of the existing Consumer Premises Equipment (CPE), for example, existing Set Top Boxes (STBs) and/or Modems, may continue to operate "as is", e.g., for transmitting and/or receiving conventional signals and/or expanded broadband signals. The existing CPE may be uninfluenced by the parallel local fiber optical system of the present invention. Accordingly, methods and/or devices according to some embodiments of the invention may be implemented at a reduced cost and/or complexity compared to conventional technologies for extension of bandwidth over CATV networks that may require the use of non-standard and/or proprietary CPE and/or head-end equipment.

According to some demonstrative embodiments of the invention, the local fiber optical system may be used in conjunction with a local coaxial system with an expanded frequency band, for example, a coaxial system employing suitable frequency up-conversion and/or down-conversion schemes, also referred to as Block Division Multiplexing ("BDM"), e.g., as described in U.S. patent application Ser. No. 10/869,578, filed Jun. 16, 2004, entitled "A Wideband Node in a CATV Network" (Reference 1); European Patent Application 04253439, filed Jun. 10, 2004, entitled "A Wideband Node in a CATV Network", and published Dec. 21, 2005 as EP Publication No. 1608168 (Reference 2); and/or in U.S. patent application Ser. No. 11/041,905, filed Jan. 25, 2005, entitled "DEVICE, SYSTEM AND METHOD FOR CONNECTING A SUBSCRIBER DEVICE TO A WIDEBAND DISTRIBUTION NETWORK", and published Jul. 14, 2005 as U.S. publication No. 2005/0155082 (Reference 3), the entire disclosures of all of which applications are incorporated herein by reference. This may result in further expansion of the frequency band of the local system. For example, the local fiber optics according to embodiments of the invention may be installed in parallel with existing coaxial system implementing BDM, forming a hybrid system that enables hyper expansion of symmetric bandwidth at a relatively low cost. Additionally or alternatively, the downstream and/or upstream bandwidth may be expanded by DWM and/or Dense Wave Division Multiplexing (DWDM) technologies, e.g., as are known in the art.

Some demonstrative embodiments of the invention may enable expansion of downstream and/or upstream transmission bandwidths of CATV systems, using relatively low-cost optical elements in the local optical system. This may be achieved, for example, by modulating downstream and/or upstream signals to be used by the local optical system on a carrier light beam at a wavelength that may be reproduced by relatively simple optical devices. For example, in some embodiments, visible light beams of two different wavelengths, e.g., corresponding to the red and green spectrums, may be used for upstream and downstream, respectively, in the local system.

According to some demonstrative embodiments of the invention, the local upstream and/or downstream wavelengths may be different from the downstream and upstream wavelengths (e.g., of 1550 nm and 1310 nm, respectively) used for communication between the head-end and the local nodes.

According to some demonstrative embodiments of the invention, expanded downstream data from the head-end may be detected at the local node and converted into corresponding electrical signals, which may then be further converted electrically to a standard bandwidth to be routed to the subscribers via the local coaxial system. Expanded upstream data from the subscribers may be detected at the local node and converted into electrical signals in a standard upstream bandwidth, and then converted into corresponding optical signals to be sent back to the head-end. This electrical-to-optical and optical-to-electrical conversion may be performed by suitable converters at the head-end and/or at the local node, e.g., according to frequency up-conversion and/or down-conversion schemes, as are described in detail in References 1, 2 and/or 3. The local fiber optical system of the present invention, which may be laid in parallel with the existing coaxial cables, may be used to communicate the expanded bandwidth between the subscribers and the local node.

According to some demonstrative embodiments of the invention, the local optical system may include an optical adapter ("gathering box"), which may be installed, for example, in parallel with the passive elements of the local coaxial system.

According to some demonstrative embodiments of the invention, the optical adapter may include an optical connector to optically connect the adapter to the local optic fiber; and at least one interface. The interface may include first and second radio-frequency connectors; and an optical to radio-frequency converter to convert a downstream optical signal received via the optical connection into an extended downstream radio-frequency signal in an extended downstream frequency band. The optical connector may also include triplexer to route the extended downstream signal to the first radio-frequency connector; to route a legacy downstream radio-frequency signal in a legacy frequency band from the second radio-frequency connector to the first radio-frequency connector; and/or to route a legacy upstream radio-frequency signal in the legacy frequency band from the first radio-frequency connector to the second radio-frequency connector. The triplexer may include, for example, a three or four section filter.

According to some demonstrative embodiments of the invention, the interface may also include a radio-frequency to optical converter to convert an extended upstream radio-frequency signal in an extended upstream frequency band into an upstream optical signal. The triplexer may also be able to route the extended upstream signal from the first radio-frequency connector to the radio-frequency to optical converter.

According to some demonstrative embodiments of the invention, the optical adapter may include two or more interfaces. In these embodiments, the optical adapter may also include an optical splitter/combiner to split the downstream optical signal into two or more optical downstream signals; to direct the two or more optical downstream signals to the optical to radio-frequency converters of the two or more interfaces, respectively; and to direct two or more upstream optical signals received from the two or more interfaces to the optical connector.

Some demonstrative embodiments of the invention may be used in conjunction with a Wideband Subscriber Interface Unit (also referred to as an XTB) at the subscriber end, e.g., as described in References A and/or B, enabling use of existing CPE in conjunction with equipment according to the invention. The XTB may receive from the subscribers standard CATV data, e.g., 48 MHz to 1000 MHz downstream and 5 MHz to 42 MHz (OR 85 MHz) upstream, and provide the expanded, e.g., BDM multiplexed, data in higher downstream and upstream frequency ranges, which may be converted to respective new ranges within the legacy upstream and downstream bands. For example, a 1250 MHz to 1950 MHz expanded downstream band may be converted to a 160 to 860 MHz new downstream legacy band, and a 2250 to 2750 MHz expanded upstream band may be converted to multiples of 5-42 MHz (or 10 to 85 MHz) in the upstream band.

It will be appreciated that this aspect of the invention is not limited to any specific expanded frequency ranges, and that any other desired ranges may also be suitable for use in conjunction with embodiments of the invention; for example, some embodiments of the invention may use a 1100-1900 MHz expanded downstream range and/or a 2100-2900 MHz expanded upstream range.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF SOME DEMONSTRATIVE EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Various systems, methods and devices for expanding the effective bandwidth of conventional Cable Television (CATV) networks beyond the limited ranges of conventional downstream and upstream signals, e.g., by 200 percent or more, are described in References 1, 2 and/or 3. As described in these applications, the expansion of bandwidth may be achieved by introducing new active electronic devices, as well as new passive elements, along the last-mile coaxial portion of an existing HFC or other CATV network.

In some demonstrative embodiments of the invention described herein, the term "wide frequency band" may refer to an exemplary frequency band of, e.g., 5-3000 MHz; the term "extended upstream frequency band" may refer to an exemplary frequency band of 2250-2750 MHz; the term "extended downstream frequency band" may refer to an exemplary frequency band of 1250-1950 MHz; the term "legacy upstream frequency band" may refer to an exemplary frequency band of 5-42 MHz or 5-60 MHz; the term "legacy downstream frequency band" may refer to an exemplary frequency band of 54-860 MHz; and the term "legacy frequency band" may refer to an exemplary frequency band of 5-860 MHZ. However, it will be appreciated by those skilled in the art that in other embodiments of the invention, these exemplary frequency bands may be replaced with any other suitable wide frequency band, extended upstream frequency band, extended downstream frequency band, legacy downstream frequency band, legacy upstream frequency band, and/or any desired frequency band. For example, the systems, devices and/or methods of some embodiments of the invention may be adapted for a wide frequency band of between 5 MHz and more than 3000 MHz, e.g., 4000 MHz, and/or a legacy band of 5-1000 MHz.

Figure 1:
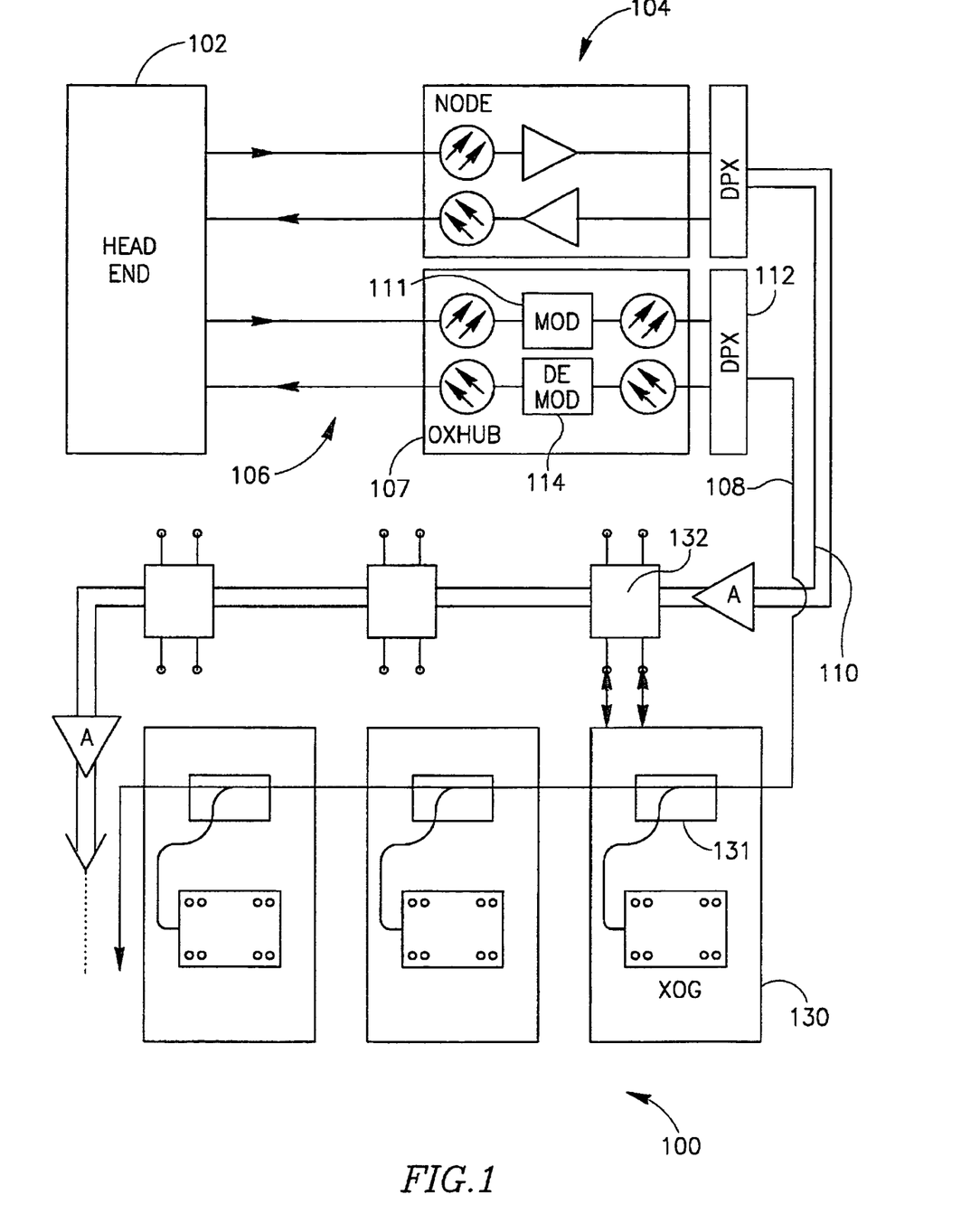
FIG. 1 is a schematic illustration of a hybrid optical-coaxial communication system according to some demonstrative embodiments of the present invention.

FIG. 1 schematically illustrates a hybrid optical-coaxial communication system according to some demonstrative embodiments of the present invention, showing the signal flow throughout the system.

According to some demonstrative embodiments of the invention, system 100 may include a head-unit 102 able to communicate with a node 104 via optical fibers 106, e.g., as is known in the art. Downstream signals may be modulated on a carrier light beam having a wavelength of, for example, 1,550 nm or any other suitable wavelength, and upstream signals may be modulated on a carrier light beam having a wavelength of, for example, 1,310 nm or any other suitable wavelength.

Node 104 may include any suitable configuration, e.g., as is known in the art, for converting downstream optical signals received via fibers 106 into legacy downstream RF signals for transmission via a coaxial cable (coax) 110, and/or for converting legacy upstream RF signals received via coax 110 into optical signals suitable for transmission via fibers 106.

According to some demonstrative embodiments of the invention, system 100 may also include one or more taps 132 to distribute legacy downstream signals received from node 104 via coax 110 to one or more users (subscribers), and/or to provide node 104 via coax 110 with legacy upstream signals received from one or more subscribers, e.g., as is known in the art.

According to demonstrative embodiments of the invention, the downstream and/or upstream signals may include an expanded bandwidth enabled by block division multiplexing, e.g., as described in Appendix A and Appendix B. Additionally or alternatively, expanded downstream and/or upstream bandwidth between head-end 102 and node 104 may be achieved by DWM and/or DWDM technologies as are known in the art.

According to demonstrative embodiments of the invention, node 104 may include an Optical Hub (OHUB) 107, which may include a modulator 111 able to detect expanded downstream data optically received via fibers 106, and to modulate the expanded downstream data on a light beam of a wide bandwidth at a first wavelength, e.g., corresponding to a red spectrum, to be sent to the subscribers via a local fiber-optical cable 108. OHUB 107 may also include a demodulator 114 able to detect expanded upstream data modulated on a light beam of a second wavelength, e.g., corresponding to a green spectrum, optically received via local fiber 108, and to demodulate the received expanded upstream data into expanded upstream data in a standard legacy format which may be transferred over fibers 106. Node 104 may also include, for example, an optical duplexer 112 to selectively transfer to local fiber 108 the light beam of the first wavelength received from modulator 111, and/or to demodulator 114 the light beam of the second wavelength received from fiber 108. It will be appreciated by persons skilled in the art that the invention is not limited to the specific demonstrative wavelengths described above, e.g., red and green wavelengths, and that any other suitable wavelengths may be used to carry the local upstream and/or downstream optical signals according to embodiments of the invention. OHUB 107 may include any suitable configuration, e.g., as described in References 1 and/or 2.

According to demonstrative embodiments of the invention, system 100 may include one or more optical adapters ("Optical Gathering Boxes (OGBs)") 130 to selectively transfer expanded upstream and/or expanded downstream data to/from one or more subscribers via local fiber 108; and upstream and/or downstream data via tap 132 and coax 110, as described in detail below.

OGB 130 may be connected to local fiber 108 through an optical coupler 131, which may have, for example, very low pass attenuation. This may enable serially connecting a large number of OGBs 130, e.g. one hundred OGBs, with relatively low optical path loss.

According to some demonstrative embodiments of the invention, OGB 130 may include at least one interface, which may include first and second radio-frequency connectors. The first connector may be coupled to a subscriber, and/or the second connector may be coupled to tap 132, e.g., as described in detail with reference to FIGS. 2A-3B.

According to some demonstrative embodiments of the invention, OGB 130 may also include an optical to radio-frequency converter to convert a downstream optical signal received via coupler 131 into an extended downstream radio-frequency signal in an extended downstream frequency band, e.g., as described in detail with reference to FIG. 4A and/or FIG. 4B.

Figure 4A:
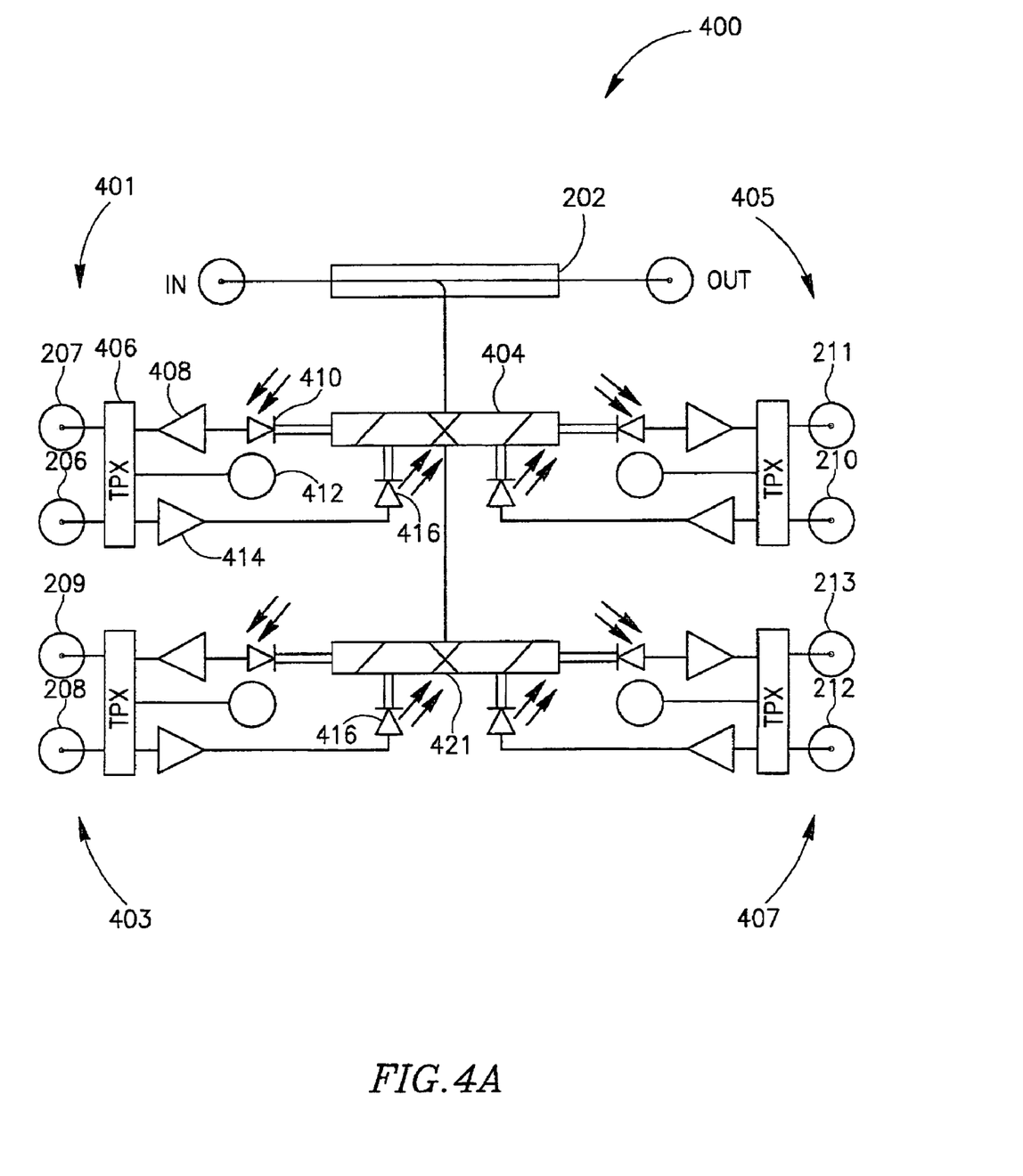
FIG. 4A is a schematic illustration of an OGB configuration according to one demonstrative embodiment of the invention.
Figure 4B:
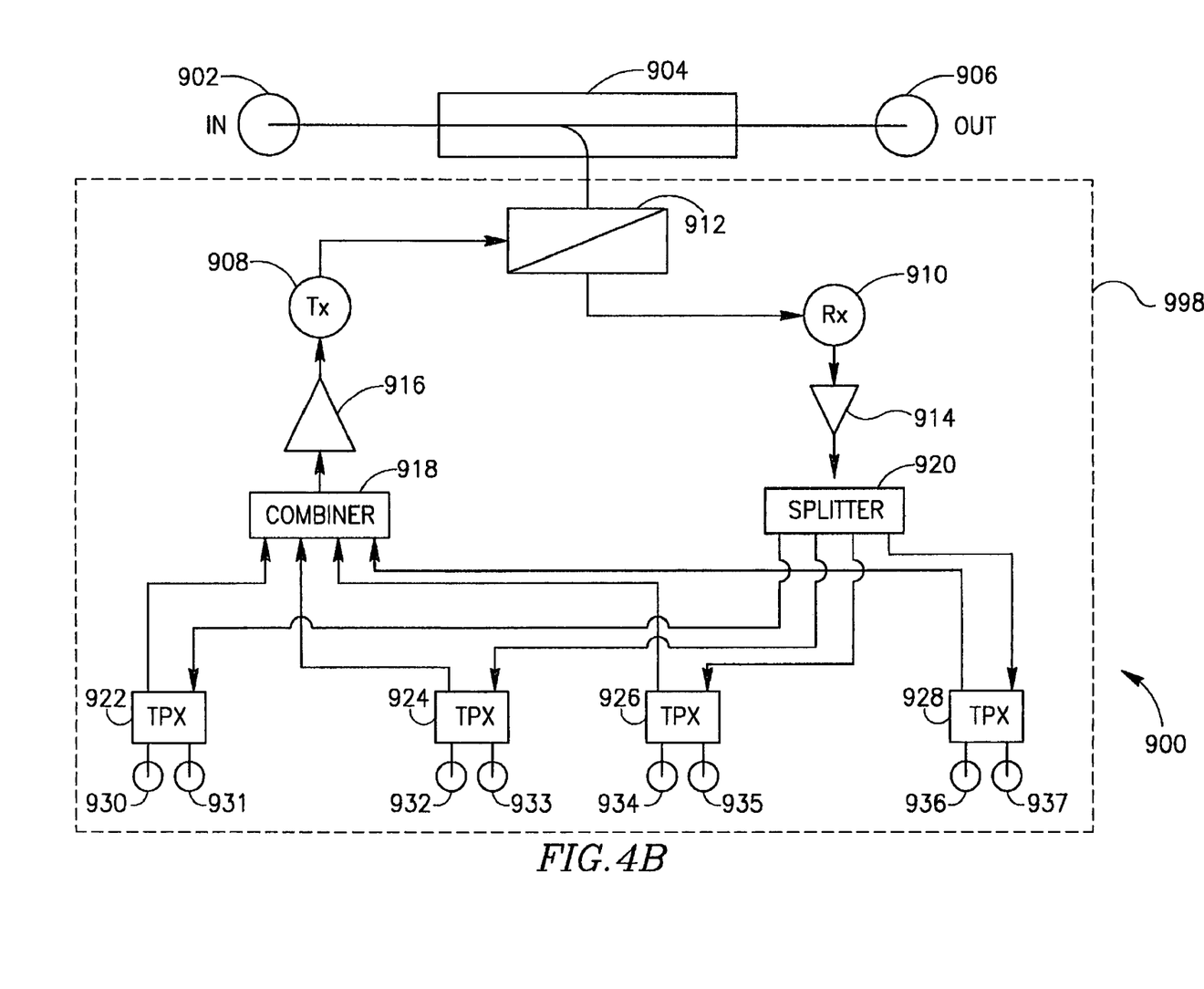
FIG. 4B is a schematic illustration of an OGB configuration according to another demonstrative embodiment of the invention.

According to some demonstrative embodiments of the invention, OGB 130 may also include a triplexer to route the extended downstream signal to the first radio-frequency connector; to route a legacy downstream radio-frequency signal in a legacy frequency band from the second radio-frequency connector to the first radio-frequency connector; and to route a legacy upstream radio-frequency signal in the legacy frequency band from the first radio-frequency connector to the second radio-frequency connector, e.g., as described in detail with reference to FIG. 4A and/or FIG. 4B.

According to some demonstrative embodiments of the invention, OGB 130 may also include, a radio-frequency to optical converter to convert an extended upstream radio-frequency signal in an extended upstream frequency band into an upstream optical signal; and the triplexer may route the extended upstream, signal from the first radio-frequency connector to the radio-frequency to optical converter, e.g., as described in detail with reference to FIG. 4A and/or FIG. 4B.

Figure 2A:
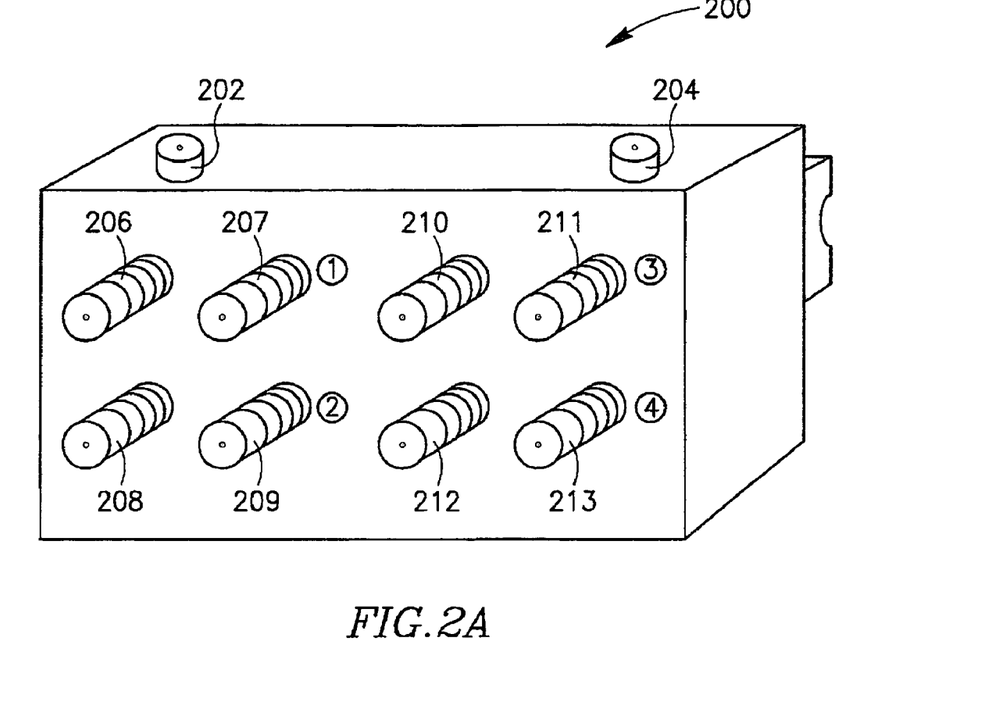
FIGS. 2A and 2B are schematic illustrations of a 4-tap Optical Gathering Box (OGB) and an 8-tap OGB, respectively, in accordance with some demonstrative embodiments of the invention.
Figure 2B:
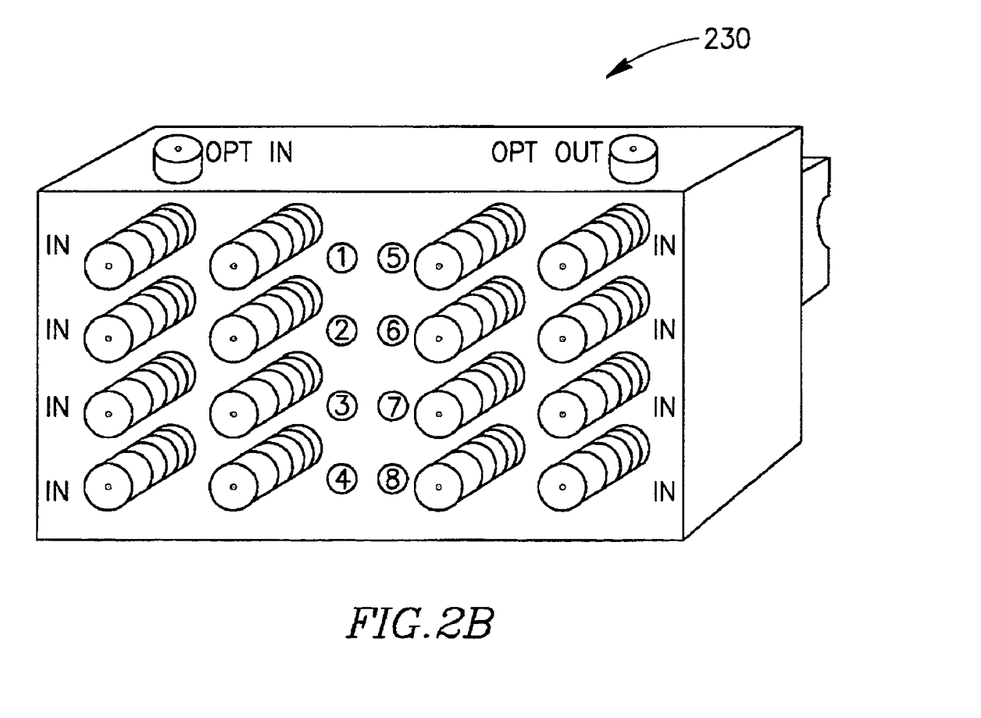

Reference is made to FIGS. 2A and 2B, which schematically illustrate a 4-tap OGB 200 and an 8-tap OGB 230, respectively, in accordance with some demonstrative embodiments of the invention. Although the invention is not limited in this respect, OGB 200 and/or OGB 230 may perform the functionality of at least one of OGBs 130 (FIG. 1).

According to some demonstrative embodiments of the invention, OGB 200 may include an optical input 202 and an optical output 204 connectable to a local optical fiber, e.g., local fiber 108 (FIG. 1).

According to some demonstrative embodiments of the invention, OGB 200 may also include four subscriber connectors, e.g., connectors 207, 209, 211 and 213, which may be connected to CATV wall outlets of four subscribers, respectively. Connectors 207, 209, 211 and/or 213 may include, for example, female "F type" connectors, e.g., adapted for passing 3 GHZ signals, as are known in the art.

According to some demonstrative embodiments of the invention, OGB 200 may also include four RF tap connectors, e.g., connectors 206, 208, 210 and 212, which may be connected with four, respective, subscriber inputs of a legacy coax "F type" tap, e.g., tap 132. Connectors 206, 208, 210 and/or 212 may include, for example, "F type" taps adapted for passing 750 MHZ, 860 MHz, or 1000 MHZ, e.g., in accordance with legacy CATV specifications as known in the art.

According to some demonstrative embodiments of the invention, OGB 230 may include a configuration of eight subscriber connectors and eight tap connectors, e.g., analogous to the 4-tap configuration of OGB 200.

According to demonstrative embodiments of the invention, OGB 200 and/or 230 may be closed, e.g., hermetically, and may be configured to withstand environmental conditions, e.g., as are specified for CATV out-door apparatuses.

Figure 3A:
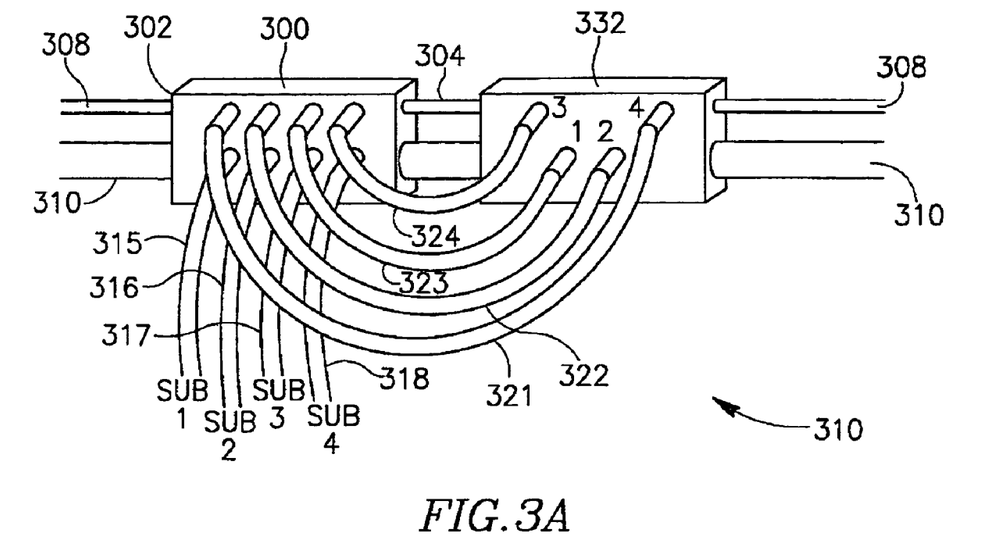
FIGS. 3A and 3B, are schematic illustrations of a 4-tap OGB according to some demonstrative embodiments installed in two, respective, service configurations.
Figure 3B:
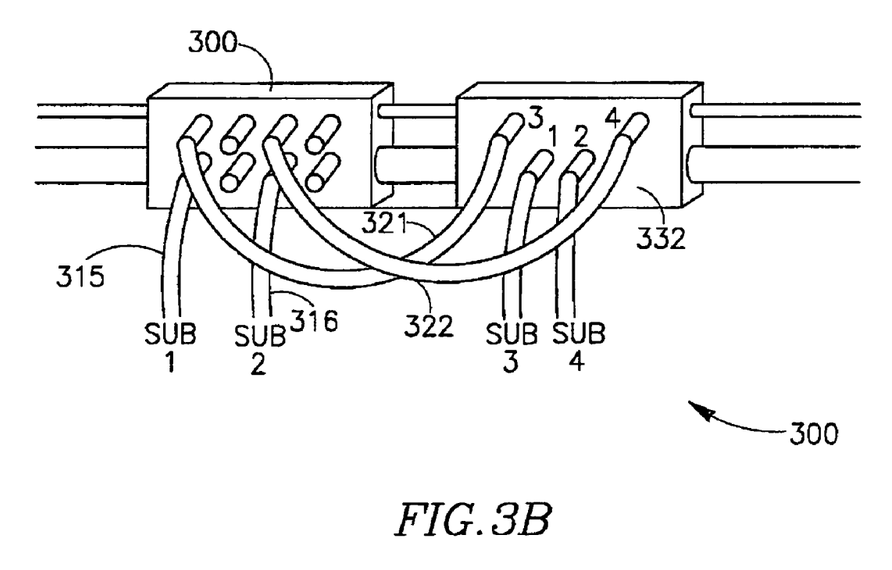

Reference is made to FIGS. 3A and 3B, which schematically illustrate an OGB 300 according to demonstrative embodiments installed in two, respective, service configurations 310 and 350.

According to demonstrative embodiments of the invention, OGB 300 may be connected between one or more subscribers and a coax tap 332. OGB 300 may be located, for example, as near as possible to a passive element, which may feed a CATV wall outlet of a subscriber, e.g., through the "F type" connector.

According to the demonstrative embodiments of FIG. 3A, configuration 310 may enable connection of four subscribers, denoted S1, S2, S3 and S4, respectively, to a local fiber 308. According to these embodiments, an optical input 302 and an optical output 304 of OGB 300 may each be connected to local fiber 308. Subscribers S1, S2, S3 and/or S4 may be connected, e.g., via four drop lines (drops) 315, 316, 317, and/or 318, to four subscriber connectors of OGB 300, respectively. Four tap connectors of OGB 300 corresponding to the four subscriber connectors may be connected, e.g., via four short lines (shorts) 321, 322, 323 and 324, to four subscriber connectors of tap 332, respectively. Tap 332 may be connected to a coax line 309, e.g., as is known in the art.

OGB 300 may be able to modulate expanded upstream data received from a subscriber, e.g., subscriber S1, S2, S3 or S4, over a light beam, e.g., of the second wavelength, to be transferred over local fiber 308, as described below. OGB 300 may also be able to transfer upstream data received from the subscriber to tap 332, e.g., if no expanded upstream data is detected.

Additionally or alternatively, OGB 300 may be able to provide the subscriber with expanded downstream data received via local fiber 308, and/or downstream data received via coax 309 and tap 332, as described in detail below.

According to the demonstrative embodiments of FIG. 3B, service configuration 350 may enable connection of only some of the subscribers, e.g., subscribers S1 and S2, respectively, to local fiber 308. According to these embodiments, optical input 302 and optical output 304 may each be connected to local fiber 308. Subscribers S1 and S2 may be connected, e.g., via two drop lines, 315 and 316, respectively, to two respective subscriber connectors of OGB 300. Two tap connectors of OGB 300, corresponding to the two connected subscribers, may be connected to two subscriber connectors of tap 332, e.g., via two shorts 321 and 322, respectively. According to the demonstrative embodiments of FIG. 3B, the subscribers not subscribed to use optical fiber 308, e.g., subscribers S3 and S4, may be connected directly to tap 332, e.g., for upstream and/or downstream communication via coax 309.

It will be appreciated that the configuration described above may enable downstream and/or upstream flow of legacy data via coax 309, for example, without interference from the flow of the expanded bandwidth of upstream and/or downstream data via optical fiber 308.

Reference is made to FIG. 4A, which schematically illustrates OGB configuration 400 according to one demonstrative embodiment of the invention. Although the invention is not limited in this respect, configuration 400 may be implemented, for example, by 4-tap OGB 200.

According to demonstrative embodiments of the invention, OGB configuration 400 may include an optical coupler 402 to couple/decouple optical signals to/from a local optical fiber, e.g., fiber 108 (FIG. 1). This may enable efficiently connecting a large number of OGBs along the optical fiber, e.g., without generally affecting a signal to noise level of optical signals transferred via the local fiber. The optical signals may include, for example, an optical downstream signal, e.g., having a wavelength of between 400 and 560 nm, and/or an optical upstream signal, e.g., having a wavelength of between 660 and 1550 nm.

According to some demonstrative embodiments of the invention, OGB 200 may include at least one interface, e.g., four OGB interfaces 401, 403, 405 and 407. At least one of interfaces 401, 403, 405 and 407 may include a triplexer 406, a downstream amplifier 408, an optical-to-RF converter 410, a power source 412, an upstream amplifier 414, and/or a RF-to-optical converter 416, as are described below.

According to some demonstrative embodiments of the invention, triplexer 406 may be connected, e.g., on one side, to subscriber connector 207 and to tap connector 206; and to amplifier 408, amplifier 414 and power source 412, e.g., on another side. Triplexer 406 may be able to provide subscriber connector 207 with expanded downstream signals received via amplifier 408; to provide subscriber connector 207 with downstream signals received from tap connector 206; to provide upstream amplifier 414 with expanded upstream signals received from subscriber connector 207; and/or to provide tap connector 206 with upstream signals received from subscriber connector 207.

According to some demonstrative embodiments, triplexer 406 may enable only legacy CATV signals to pass, e.g., if no subscriber is connected to connector 207.

Figure 5:
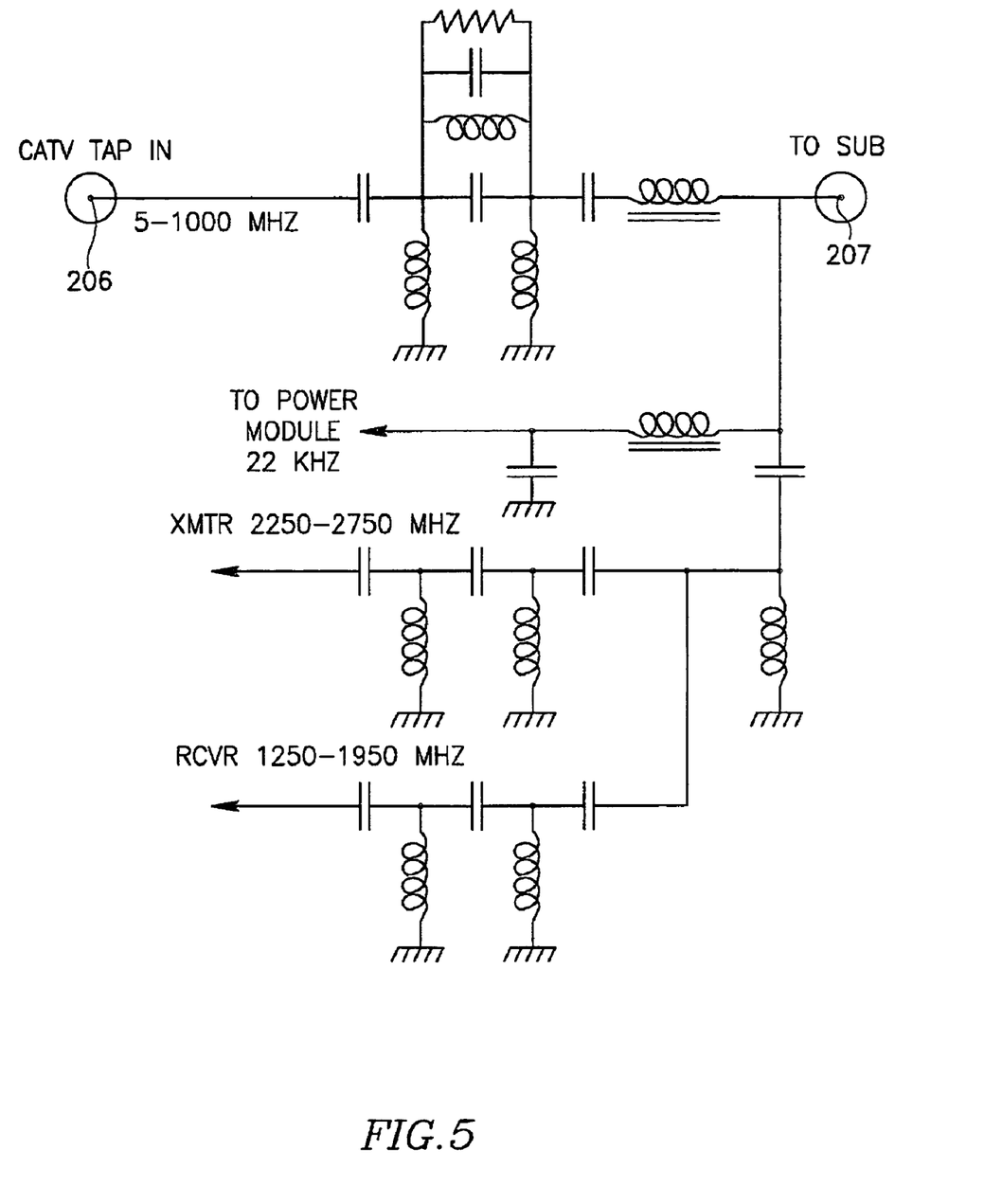
FIG. 5 is a schematic illustration of a triplexer according to some demonstrative embodiments of the invention.

According to some demonstrative embodiments of the invention, triplexer 406 may be constructed, for example, with SMD lamped elements, e.g., as illustrated in FIG. 5, and/or using any other suitable technologies, e.g., including CMOS integration.

Power source 412 may include any suitable configuration, for example, able to convert a power input, e.g., a 15 volt 22 KHZ AC power input, into electrical power in a form suitable for triplexer 406 of each of the OGB interfaces, e.g., as described below.

Amplifier 408 may include, for example, a 1250-1950 MHz 18 dB amplifier. Amplifier 414 may include, for example, a 2250-2750 MHz 16 dB amplifier. Amplifiers 408 and/or 414 may include any other suitable amplifier, e.g., corresponding to the extended upstream and/or downstream frequency bands.

According to some demonstrative embodiments of the invention, optical-to-RF converter 410 may include any suitable converter, e.g., a diode. For example, optical-to-RF converter 410 may include a diode corresponding to the first wavelength, e.g., a red diode, implemented for expanded downstream signals. RF-to-optical converter 416 may include any suitable converter, e.g., a diode. For example, RF-to-optical converter 416 may include a diode corresponding to the second wavelength, e.g., a green diode, implemented for expanded upstream signals.

According to some demonstrative embodiments of the invention, OGB 200 may also include two optical splitters 404, and 421 able to pass, combine, or separate a light beam according to the wavelength of the light beam. For example, splitter 404 may be able to split a light beam from coupler 202 to one or more optical-to-RF converters 410; and/or to combine one or more light beams from one or more RF-to-optical converters 416 into a combined light beam to be provided to coupler 202. Optical splitter may include, for example, a doublet dichoric mirror with built-in wavelength filters, e.g., as is known-in-the art.

It will be appreciated that the configuration of FIG. 4 may allow substantially no transfer of signals ("signal theft") between one or more subscribers connected to one or more of connectors 207, 209, 211 and 213, since each subscriber is connected via a different triplexer 406.

Some embodiments of the invention are described herein with relation to a system, e.g., system 100 (FIG. 1), including a local optical fiber, e.g., local fiber 108 (FIG. 1), for transferring both the upstream and the downstream data. According to these embodiments, the system may include an OGB, e.g., OGB 200, able to modulate the downstream data on a red light beam, and the upstream data on a green light beam. However, it will be appreciated by those skilled in the art that according to other embodiments of the invention, any other suitable configuration of one or more local fibers may be used. For example, the system may include a first local fiber for transferring upstream data using a first wavelength, e.g., a red or infrared wavelength, and a second local fiber for transferring downstream data using a second wavelength, e.g., a green wavelength, or any other desired wavelengths. Both these local fibers may be, for example, optically coupled to each OGB.

Reference is made to FIG. 4B, which schematically illustrates OGB configuration 900 according to another demonstrative embodiment of the invention. Although the invention is not limited in this respect, configuration 900 may be implemented, for example, by 4-tap OGB 200.

According to demonstrative embodiments of the invention, OGB 900 may be connected to fiber 108 (FIG. 1), e.g., by an input port 902 and an output port 906. OGB configuration 900 may include an optical coupler 904 to couple/decouple optical signals to/from a local optical fiber, e.g., fiber 108 (FIG. 1). This may enable efficiently connecting a large number of OGBs along the optical fiber, e.g., without generally affecting a signal to noise level of optical signals transferred via the local fiber. The optical signals may include, for example, an optical downstream signal, e.g., having a wavelength of between 400 and 560 nm, and/or an optical upstream signal, e.g., having a wavelength of between 660 and 1550 nm.

According to some demonstrative embodiments of the invention, OGB 900 may include an interface 998. Interface 998 may include at least one triplexer, e.g., triplexers 922, 924, 926, and 928. Interface 998 may also include a downstream amplifier 914, an optical-to-RF converter 910, an upstream amplifier 916, a combiner 918, a splitter 920, and/or a RF-to-optical converter 908, as are described below.

According to some demonstrative embodiments of the invention, triplexer 922 may be connected, e.g., on one side, to a subscriber connector 930 and to a tap connector 931; and to combiner 918, and splitter 920, e.g., on another side. Triplexer 922 may be able to provide subscriber connector 930 with expanded downstream signals received via splitter 920; to provide subscriber connector 930 with downstream signals received from tap connector 931; to provide combiner 918 with expanded upstream signals received from subscriber connector 930; and/or to provide tap connector 931 with upstream signals received from subscriber connector 930. Triplexer 924 may be connected, e.g., on one side, to a subscriber connector 932 and to a tap connector 933; and to combiner 918, and splitter 920, e.g., on another side. Triplexer 924 may be able to provide subscriber connector 932 with expanded downstream signals received via splitter 920; to provide subscriber connector 932 with downstream signals received from tap connector 933; to provide combiner 918 with expanded upstream signals received from subscriber connector 932; and/or to provide tap connector 933 with upstream signals received from subscriber connector 932. Triplexer 926 may be connected, e.g., on one side, to a subscriber connector 934 and to a tap connector 935; and to combiner 918, and splitter 920, e.g., on another side. Triplexer 926 may be able to provide subscriber connector 934 with expanded downstream signals received via splitter 920; to provide subscriber connector 934 with downstream signals received from tap connector 935; to provide combiner 918 with expanded upstream signals received from subscriber connector 934; and/or to provide tap connector 935 with upstream signals received from subscriber connector 934. Triplexer 928 may be connected, e.g., on one side, to a subscriber connector 936 and to a tap connector 937; and to combiner 918, and splitter 920, e.g., on another side. Triplexer 928 may be able to provide subscriber connector 936 with expanded downstream signals received via splitter 920; to provide subscriber connector 936 with downstream signals received from tap connector 937; to provide combiner 918 with expanded upstream signals received from subscriber connector 936; and/or to provide tap connector 937 with upstream signals received from subscriber connector 936.

According to some demonstrative embodiments, triplexers 922, 924, 926, and/or 928 may enable only legacy CATV signals to pass, e.g., if no subscriber is connected to connectors 930, 932, 934, and/or 936, respectively.

According to some demonstrative embodiments of the invention, triplexers 922, 924, 926 and/or 928 may be constructed, for example, with SMD lamped elements, e.g., as illustrated in FIG. 5, and/or using any other suitable technologies, e.g., including CMOS integration.

Amplifier 914 may include, for example, a 1250-1950 MHz 18 dB amplifier. Amplifier 916 may include, for example, a 2250-2750 MHz 16 dB amplifier. Amplifiers 914 and/or 916 may include any other suitable amplifier, e.g., corresponding to the extended upstream and/or downstream frequency bands.

According to some demonstrative embodiments of the invention, optical-to-RF converter 910 may include any suitable converter, e.g., a diode. For example, optical-to-RF converter 910 may include a diode corresponding to the first wavelength, e.g., a red diode, implemented for expanded downstream signals. RF-to-optical converter 908 may include any suitable converter, e.g., a diode. For example, RF-to-optical converter 908 may include a diode corresponding to the second wavelength, e.g., a green diode, implemented for expanded upstream signals.

According to some demonstrative embodiments of the invention, combiner may include any suitable RF combiner to provide one or more upstream signals received from triplexers 922, 924, 926, and 926 to amplifier 916. Splitter 920 may include any suitable RF splitter to the downstream RF signal received from amplifier 914 into two or more RF signals, e.g., four RF signals, to be provided to two or more triplexers, e.g., triplexers 922, 924, 926, and 926, respectively.

According to some demonstrative embodiments of the invention, OGB 900 may also include a selective optical reflector 912 to reflect, deflect, transmit or route a light beam according to the wavelength of the light beam. For example, reflector 912 may be able to direct a light beam from coupler 904 towards optical-to-RF converter 910; and/or to direct a light beams from RF-to-optical converter 908 towards coupler 904. Reflector 912 may include, for example, a dichoric mirror with built-in wavelength filters, e.g., as is known in the art.

It will be appreciated that the configuration of FIG. 4 may allow substantially no transfer of signals ("signal theft") between one or more subscribers connected to one or more of connectors 930, 932, 934 and 936, since each subscriber is connected via a different triplexer.

Figure 6:
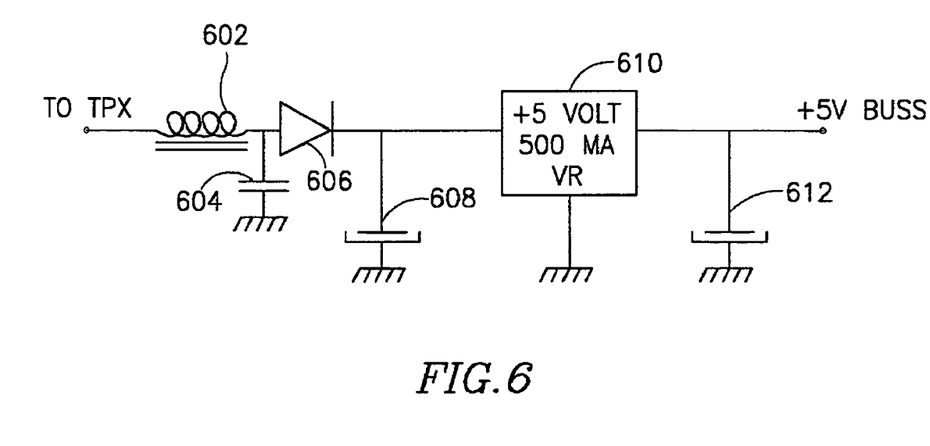
FIG. 6 is a schematic illustration of OGB power module circuitry according to some demonstrative embodiments of the invention.

FIG. 6 schematically illustrates OGB power module circuitry 600 according to demonstrative embodiments of the invention. Although the invention is not limited in this respect, circuitry 600 may perform the functionality of power source 412 (FIG. 4).

According to some demonstrative embodiments of the invention, power module 600 may include a RF separation coil 602, a RF damping capacitor 604, and a fast high performance diode 606, e.g., to rectify a 22 KHZ 15 volt AC into a 10 volt DC, which may be collected at a capacitor, e.g., a Tantalum capacitor 608. The output of diode 606, e.g., a 10 volts DC signal, may be regulated, for example, to 0.1%, with a regulator 610, e.g., a standard T05 ½ watt +5 volt IC regulator. The regulated output may then be filtered using a capacitor 612. According to other embodiments of the invention, power circuitry 600 may include any other suitable configuration.

Figure 7:
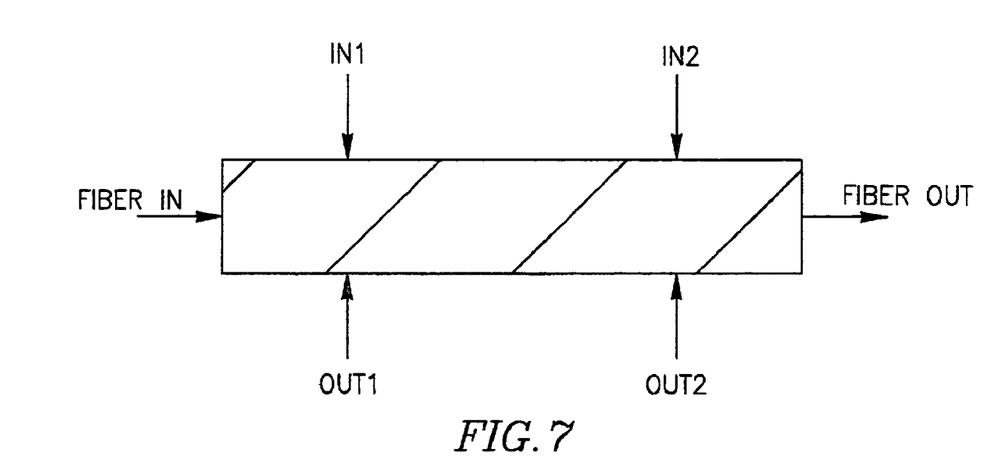
FIG. 7 is a schematic illustration of an OGB optical splitter according to some demonstrative embodiments of the invention.

FIG. 7 schematically illustrates an OGB optical splitter according to demonstrative embodiments of the invention. Although the invention is not limited in this respect, the optical splitter of FIG. 7 may perform the functionality of splitter 404 (FIG. 4). The optical splitter of FIG. 7 may be adapted, for example, to provide one or more outputs having an attenuation factor of, for example, at least 6 dB.

Figure 8A:
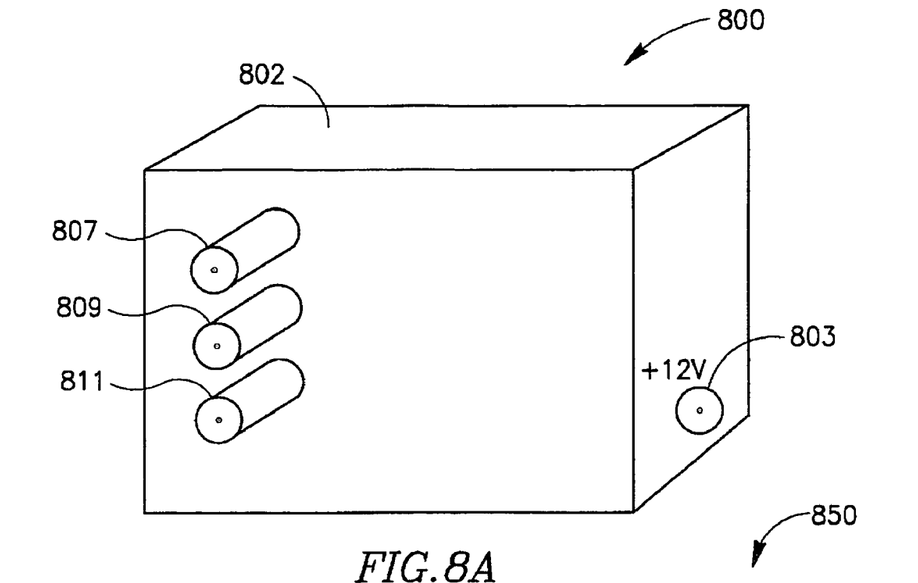
FIG. 8A is a schematic illustration of an Optical Set Top Box (OSTB) according to some demonstrative embodiments of the invention.
Figure 8B:
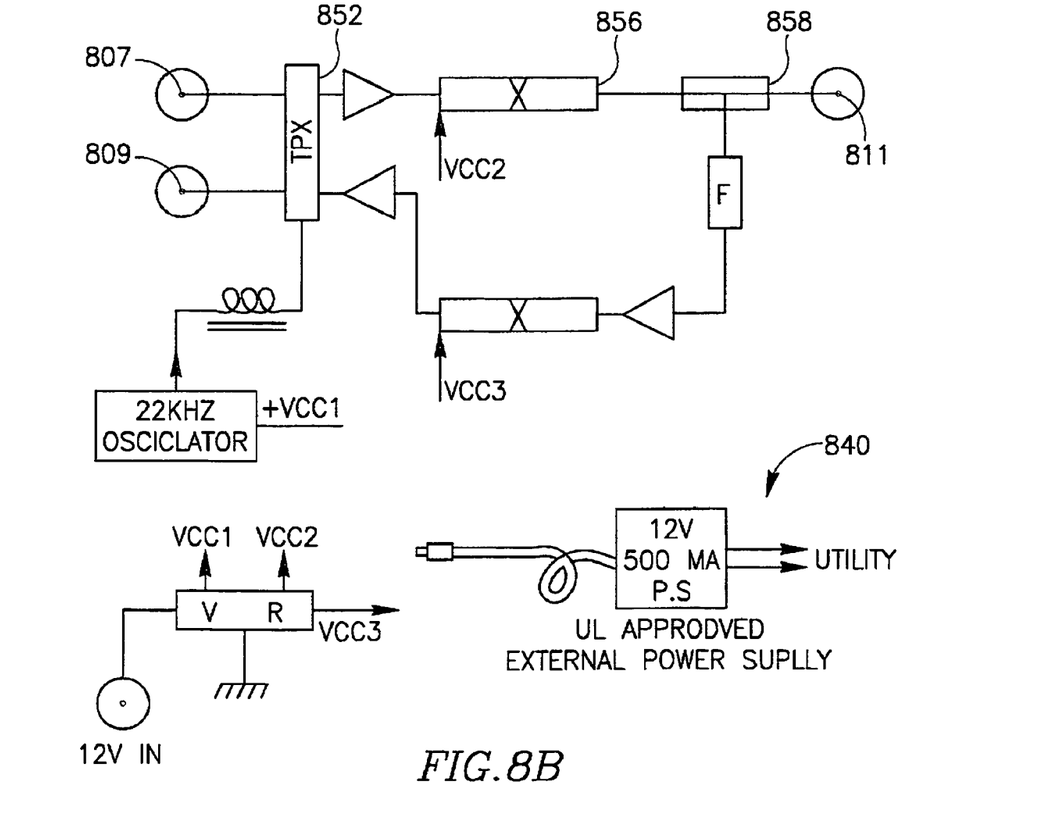
FIG. 8B is a schematic illustration of OSTB circuitry that may be used in the optical set top box of FIG. 8A.

FIG. 8A schematically illustrates a subscriber Optical Set Top Box (OSTB) 800 according to demonstrative embodiments of the invention, and FIG. 8B schematically illustrates OSTB circuitry 850 that may be used in OSTB 800.

According to demonstrative embodiments of the invention, OSTB 800 may include a housing 802 to shield circuitry 850. OSTB 800 may operate, for example, with an external UL approved power supply 840 as is known in the art, which may be connected to a power input 803 of OSTB 800. The over all consumption of OSTB 800 may be, for example, less than six watts.

According to some demonstrative embodiments of the invention, circuitry 850 may include, for example, a triplexer, 852, e.g., analogous to triplexer 406 (FIG. 4). Triplexer 852 may be able to transfer legacy CATV data, e.g., CATV data in the frequency band of 5-860 MHz or 10-1000 MHz, which may be received via a wall outlet connector 807, to a legacy CATV outlet connector 809. Legacy connector 809 may include, for example, a legacy out "F type" connector, as is known in the art.

According to some demonstrative embodiments of the invention, circuitry 850 may also include an oscillator 854, e.g., a 22 KHZ 15 volts ½ watt oscillator. Triplexer 852 may selectively associate oscillator 854 with outlet connector 807, for example, to enable oscillator 854 to feed, e.g., via triplexer 852 and wall outlet 807, a desired section of the OGB.

A power supply 840, for example, a small UL approved power supply rated at 6 Watt max (e.g., 12V at 500 mA), may be used to provide electrical power to one or more VCC's.

Expanded upstream and/or downstream data may be transferred via a connector 811. A downstream converter may convert expanded downstream data, which may be received via triplexer 852 and may have a frequency band of, e.g., 1250 and 1950 MHZ, into data of a frequency of, e.g., 160-860 MHZ.

A splitter 858 may allow upstream data of a frequency band 5-42 MHz (or 10-85) to pass to an upstream converter 860 able to convert the upstream data into converted upstream data of a frequency band of, e.g., 2250 to 2750 MHZ. Triplexer 852 may route the converted upstream data via wall outlet 807 to the OGB, where it may be modulated onto an optical, signal of a desired wavelength, e.g., as described above with reference to FIGS. 4A and/or 4B.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An apparatus comprising:
   an optical connector to optically connect said apparatus to an optic fiber; and
   at least one interface including:
   at least one pair of first and second radio-frequency connectors;
   an optical to radio-frequency converter to convert a downstream optical signal received via said optical connection into an extended downstream radio-frequency signal in an extended downstream frequency band; and
   at least one triplexer to route said extended downstream signal to said first radio-frequency connector; to route a legacy downstream radio-frequency signal in a legacy frequency band from said second radio-frequency connector to said first radio-frequency connector; and to route a legacy upstream radio-frequency signal in said legacy frequency band from said first radio-frequency connector to said second radio-frequency connector,
   wherein said extended downstream frequency band comprises at least a sub-set of a frequency band of 1000-3000 MHz.

2. The apparatus of claim 1, wherein said interface comprises:
   a radio-frequency to optical converter to convert an extended upstream radio-frequency signal in an extended upstream frequency band into an upstream optical signal,
   wherein said triplexer is able to route said extended upstream signal from said first radio-frequency connector to said radio-frequency to optical converter.

3. The apparatus of claim 2, wherein said interface comprises an upstream amplifier to amplify said extended upstream radio-frequency signal.

4. The apparatus of claim 2, wherein said at least one interface comprises two or more interfaces, said apparatus comprising:
   an optical splitter/combiner to split said downstream optical signal into two or more optical downstream signals; to direct said two or more optical downstream signals to the optical to radio-frequency converters of said two or more interfaces, respectively; and to direct two or more upstream optical signals received from said two or more interfaces to said optical connector.

5. The apparatus of claim 2, wherein said upstream and downstream optical signals have different spectrums.

6. The apparatus of claim 2, wherein said extended upstream frequency band comprises at least a sub-set of a frequency band of 1000-3000 MHz.

7. The apparatus of claim 1, wherein said at least one pair of connectors comprises two or more pairs of connectors, and said at least one triplexer comprises two or more triplexers; wherein said interface comprises a radio-frequency splitter to split said extended downstream radio-frequency signal into two or more extended downstream signals; and wherein said two or more triplexers are able to route the two or more extended downstream signals to a respective first radio-frequency connector of said two or more pairs of connectors.

8. The apparatus of claim 1, wherein said interface comprises a downstream amplifier to amplify said extended downstream radio-frequency signal.

9. The apparatus of claim 1, wherein said legacy frequency band comprises at least a sub-set of a frequency band of 5-1000 MHz.

10. The apparatus of claim 1, wherein said optical connector comprises an optical coupler.

11. A system comprising:
  a node to modulate downstream data onto an extended downstream optical signal, and transmit said extended downstream optical signal over an optic fiber;
  at least one optical adapter comprising:
    an optical connector to optically connect said apparatus to an optic fiber; and
    at least one interface including:
      at least one pair of first and second radio-frequency connectors;
      an optical to radio-frequency converter to convert said downstream optical signal into an extended downstream radio-frequency signal in an extended downstream frequency band; and
      at least one triplexer to route said extended downstream signal to said first radio-frequency connector; to route a legacy downstream radio-frequency signal in a legacy frequency band from said second radio-frequency connector to said first radio-frequency connector; and to route a legacy upstream radio-frequency signal in said legacy frequency band from said first radio-frequency connector to said second radio-frequency connector,
    wherein said extended downstream frequency band comprises at least a sub-set of a frequency band of 1000-3000 MHz.

12. The system of claim 11, wherein said interface comprises:
  a radio-frequency to optical converter to convert an extended upstream radio-frequency signal in an extended upstream frequency band into an upstream optical signal,
  wherein said triplexer is able to route said extended upstream signal from said first radio-frequency connector to said radio-frequency to optical converter, and
  wherein said extended upstream frequency band comprises at least a sub-set of a frequency band of 1000-3000 MHz.

13. The system of claim 12, wherein said interface comprises an upstream amplifier to amplify said extended upstream radio-frequency signal.

14. The system of claim 12, wherein said at least one interface comprises two or more interfaces, said system comprising:
  an optical splitter/combiner to split said downstream optical signal into two or more optical downstream signals; to direct said two or more optical downstream signals to the optical to radio-frequency converters of said two or more interfaces, respectively; and to direct two or more upstream optical signals received from said two or more interfaces to said optical connector.

15. The system of claim 12, wherein said upstream and downstream optical signals have different spectrums.

16. The system of claim 12, wherein said extended upstream frequency band comprises at least a sub-set of a frequency band of 1000-3000 MHz.

17. The system of claim 11, wherein said at least one pair of connectors comprises two or more pairs of connectors, and said at least one triplexer comprises two or more triplexers; wherein said interface comprises a radio-frequency splitter to split said extended downstream radio-frequency signal into two or more extended downstream signals; and wherein said two or more triplexers are able to route the two or more extended downstream signals to a respective first radio-frequency connector of said two or more pairs of connectors.

18. The system of claim 11 comprising:
  at least one tap device to transfer said legacy downstream radio-frequency signal from said node to said at least one interface, respectively; said tap having a first port linked to the second connector of said at least one interface, respectively, and a second port linked by a coaxial cable to said node.

19. The system of claim 11, wherein said interface comprises a downstream amplifier to amplify said extended downstream radio-frequency signal.

20. The system of claim 11, wherein said legacy frequency band comprises at least a sub-set of a frequency band of 5-1000 MHz.

21. The system of claim 11, wherein said optical connector comprises an optical coupler.

* * * * *